United States Patent [19]
Breggin

[11] Patent Number: 6,005,569
[45] Date of Patent: Dec. 21, 1999

[54] CUSTOMER-DEFINABLE HELP FILE

[75] Inventor: David G. Breggin, Littleton, Colo.

[73] Assignee: Lucent Technologies Inc., Murray Hill, N.J.

[21] Appl. No.: 08/781,702

[22] Filed: Jan. 10, 1997

[51] Int. Cl.[6] ................................................. G06F 3/00
[52] U.S. Cl. .......................................... 345/338; 345/333
[58] Field of Search .................................... 345/326–358, 345/146

[56] References Cited

U.S. PATENT DOCUMENTS

| | | | |
|---|---|---|---|
| 4,648,062 | 3/1987 | Johnson et al. | 345/338 |
| 4,800,485 | 1/1989 | Ackroff et al. | 345/336 |
| 4,823,283 | 4/1989 | Diehm et al. | 345/352 |
| 5,029,113 | 7/1991 | Miyoshi et al. | 345/336 |
| 5,142,618 | 8/1992 | Fujiwara et al. | 345/352 |
| 5,175,812 | 12/1992 | Krieger | 345/338 |
| 5,434,963 | 7/1995 | Kuwamoto et al. | 345/336 |
| 5,535,323 | 7/1996 | Miller et al. | 345/338 |
| 5,535,422 | 7/1996 | Chiang et al. | 345/336 |
| 5,546,521 | 8/1996 | Martinez | 345/338 |
| 5,581,684 | 12/1996 | Dudzik et al. | 345/338 |

OTHER PUBLICATIONS

Lotus Notes Help, Creating multiple Help documents, Creating a separate Help database, Creating a Help view, © Copyright 1996 Lotus Development Corporation, pp. 1–3.
E. R. Tello, "Object–Oriented Programming for Windows™", John Wiley & Sons, Inc., p. 94, (1991).

*Primary Examiner*—John E. Breene
*Attorney, Agent, or Firm*—David Volejnicek

[57] ABSTRACT

Custom user help information distinctive of a customer's computing environment is made available to users of a software system through the system's help facility. Creators of the software system (110) include an uncompressed modifiable and user-accessible "custom information" user help file (113) in the software system, but leave the user help file empty, devoid of any custom information. For installation of the software system at a particular customer's site (101), a user or an administrator (115) of the site populates the user help file with the custom information distinctive of that site, and thereby makes the information a part of the software system. Users of the software executing at the site can then access the custom information in the user help file by selecting a pointer (114) to that user help file from a help menu (112) of the executing software system, just like any other user help information.

8 Claims, 2 Drawing Sheets

CUSTOMER-DEFINABLE HELP FILE

TECHNICAL FIELD

This invention relates to computer programs and their structure.

BACKGROUND OF THE INVENTION

Software systems (i.e., computer programs) often include files of data that is of interest to users of the software systems, as opposed to the software systems themselves, which data is made accessible to the users. An illustrative example thereof are the "Help" files of the Windows® operating system and of Windows-based application programs. These data files are created and included in the software system by the creators of the software system.

Installation and setting up of a software system to execute on a customer's computer site is generally done either by an administrator or by a user of the site. The installation and set-up generally requires selection and programming of settings (e.g, parameter values) that are specific to that computing site, and this information is often important to the users of the software system as well as to the software system itself. Furthermore, there is often extraneous information that is important to the users of the software system, e.g., the telephone number of the computing site's help desk, or trouble-reporting procedures.

It is therefore desirable to distribute these types of information to the users of the software system, and to do so automatically and in some permanent association with the software system, so that the information will be available to the users of the software system and will not become separated from the software system and lost. However, by virtue of this information being particular to individual computing sites, this information cannot be provided and included in the software system by creators of a software system that is intended for sale to any interested customers (as opposed to creators of a custom software system developed for a particular known customer).

SUMMARY OF THE INVENTION

This invention is directed to meeting these needs and solving these and other problems of the prior art. Generally according to the invention, the creators of a software include a modifiable and user-accessible "custom information" user help file in the software, but leave the user help file empty, devoid of any custom information. Illustratively, whereas software is commonly compressed prior to its installation, the user help file is not compressed in order to facilitate editing by the customer prior to installation. For installation of the software at a particular customer's computing site, an administrator or a user of the site populates the user help file with the custom information distinctive of that particular site, and thereby makes the information a part of the software. Like information in other user help files and unlike information in software data files, such as set up information, the information in the custom user help file is there for use by users of the software and not for use by the software itself. When the software is installed on a computer by an installation program, any compressed portions of the software are decompressed, and the custom user help file is installed as a part of the decompressed software. Users of the software executing at the site can then access the custom information—for example, through a menu item (a pointer) on the application's "Help" menu—just like any other user help information. The custom information thus becomes attached to the software so that it will not get lost and so it can be accessed just like any other user help information for the software.

These and other advantages and features of the present invention will become more apparent from a description of an illustrative embodiment of the invention considered together with the drawing.

DETAILED DESCRIPTION

Figure 1:
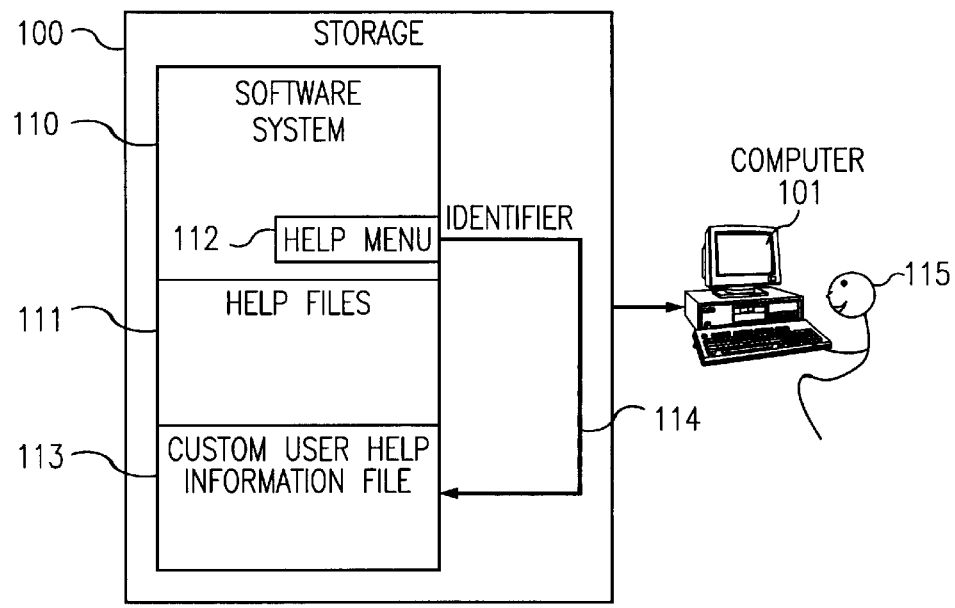
FIG. 1 is a block diagram of a computer that includes a software system that implements an illustrative embodiment of the invention.

FIG. 1 shows a software system 110 (a collection of one or more software programs) that is configured according to the invention. Software system 110 includes conventional user help files 111, and a help menu 112 to those user help files 111. According to the invention, software system 110 further includes a custom user help information file 113 and a identifier (a menu item) 114 in help menu 112 that points to help information file 113.

A creator of software system 110 creates the system with custom user help information file 113 left empty. That it, user help file 113 is empty of custom information; it may contain a template for entering and storing custom information and generic default values for some items of custom information, however. Unlike the rest of software system 110 which is typically compressed to reduce its size, user help file 113 is preferably left uncompressed by the creator to facilitate modification thereof by customers. The creator then distributes compressed software system 110 to customers, either directly or through middlemen such as distributors and sellers. Typically, software system 110 is distributed by way of a copy thereof being embedded in a storage medium 100 and the storage medium 100 being provided to a customer 115. Storage medium 100 may take many forms, such as a diskette or a CD-ROM in the case of add-on software, or a hard disk of a computer in the case of pre-loaded software. Customer 115 then installs and executes software system 110 in its own computing environment on a computer 101, in a conventional manner.

Figure 2:
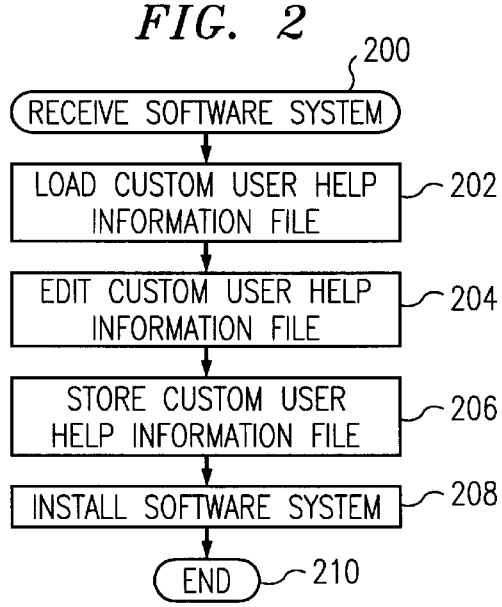
FIG. 2 is a flow diagram of steps involved in administering and installing the software system of FIG. 1.

When customer 115 obtains software system 110, at step 200 of FIG. 2, custom user help information file 113 is devoid of local information. Customer 115 (e.g., the customer itself who is also a system user in the case of a small or a single-user computing site, or a system administrator in the case of a large or a multi-user computing site, or some other agent or representative of the customer) loads custom user help information file 113 from storage 100 into a computer 101, at step 202; this step may be skipped if computer 101 comes pre-loaded with software system 110. Customer 115 then edits user help file 113 to populate it with custom user help information, at step 204. If software system 110 is a Windows-based system, preferably the editing includes editing the name of user help file 113 to provide it with a dot suffix that identifies an executable program for use with user help file 113. For example, computer 101 may use the dot suffix .HLP to indicate that the help engine is to be used to present the custom user information from user help file 113 to a user; the .DOC suffix to indicate a word processing engine; or the .XLW suffix to indicate a spreadsheet engine. Customer 115 then stores the populated user help file 113 in storage 100, at step 206, and installs software system 110 in its computing environment on one or more computers 101 for execution and for use by users, at step 208, thereby distributing the custom user help information contained in user help file 113 to the users, and ends this procedure, at step 210.

Figure 3:
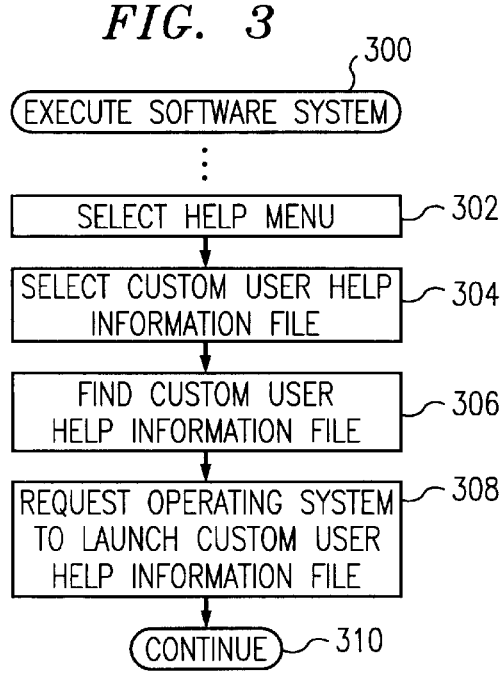
FIG. 3 is a flow diagram of steps involved in obtaining local information from the software system of FIG. 1.

When a user 115 of software system 110 executing on a computer 101, at step 300 of FIG. 3, wishes to access the custom user help information, the user selects help menu 112 on computer 101, at step 302, and when computer 101 presents (displays) help menu 112 to the user 115, selects therefrom custom user help information file 113, at step 304. In response, software system 110 finds user help file 113 in storage 100 of computer 101, at step 306, and requests the operating system of computer 101 to launch user help file 113, at step 308. Launching of user help file 113 involves executing the program that is associated with user help file 113 (e.g., the program specified by the dot suffix of the filename of user help file 113) and having the executing program use user help file 113 as its data file, whereby custom user help information from user help file 113 is presented (displayed) to user 115 of computer 101 in a conventional manner. When user 115 is done accessing custom user help information from user help file 113, execution of software system 110 continues in a conventional manner, at step 310.

Figure 4:
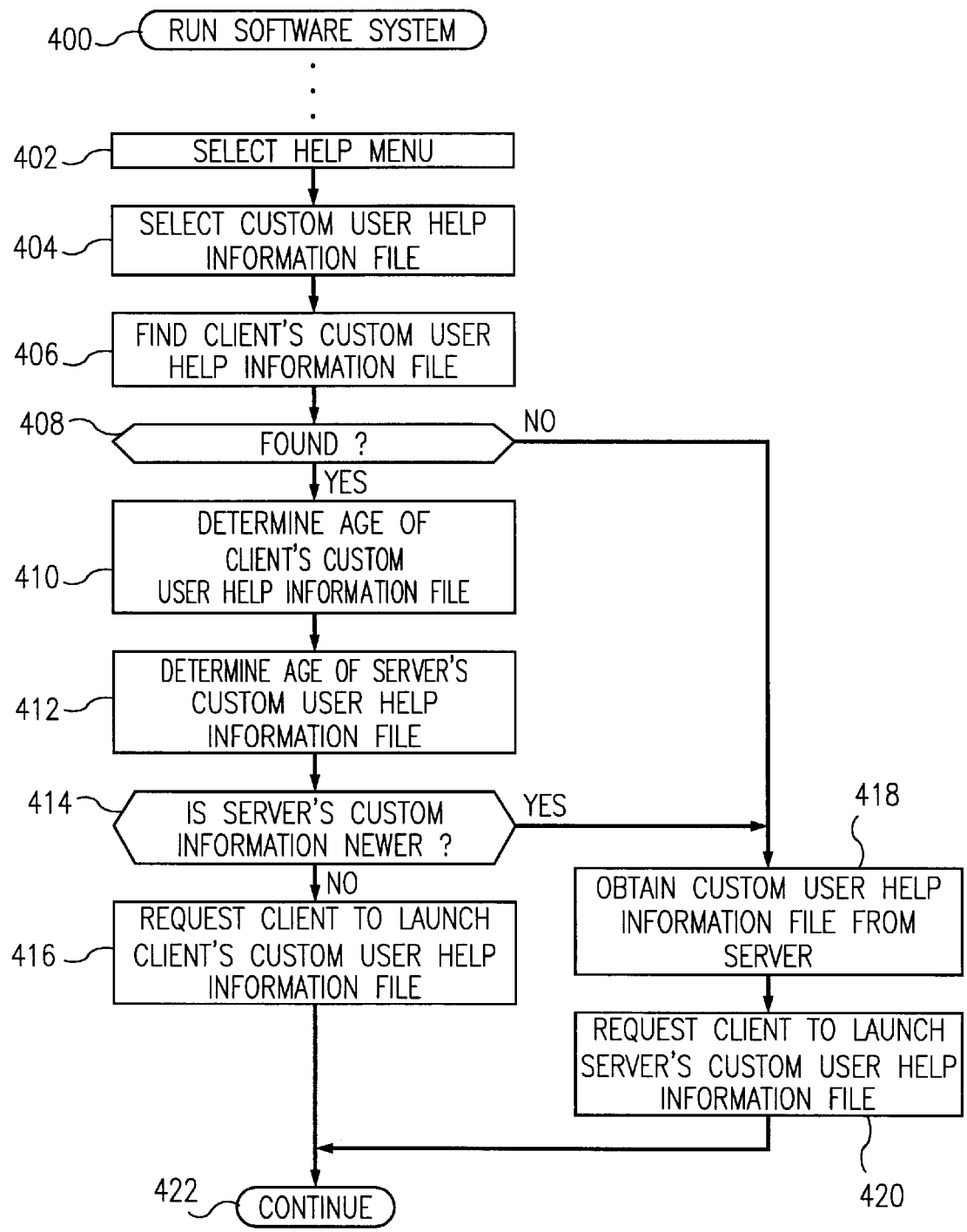
FIG. 4 is a flow diagram of alternative steps involved in obtaining local information from the software system of FIG. 1.

FIG. 4 shows an alternative procedure by which a user 115 obtains custom user help information from file 113 in a client-server computing environment where both the clients and the server may have their own copies of user help file 113. When a user 115 who uses software system 110 on a client computer, at step 400, wishes to access the custom user help information, user 115 selects help menu 112 on the client computer, at step 402, and when the client computer presents help menu 112 to user 115, selects therefrom custom user help information file 113, at step 404. In response, software system 110 looks for user help file 113 in the storage of the client computer, at step 406. If it finds user help file 113 on the client computer, as determined at step 408, it determines the age of the client computer's copy of user help file 113, at step 410, for example by requesting the client computer's operating system to provide the date on which user help file 113 was last updated (modified). Software system 110 also causes the client computer to contact the server computer and obtain from the server computer the age of the server computer's copy of user help file 113, at step 412. Software system 110 then compares the ages of the client computer's and the server computer's copies of user help file 113, at step 414. If the client computer's copy of user help file 113 is more recent, software system 110 requests the client computer to launch the client computer's copy of user help file 113, at step 416.

Returning to steps 408 and 414, if software system 110 does not find a copy of user help file 113 on the client computer, at step 408, or if software system 110 determines that the server computer's copy of user help file 113 is more recent, at step 414, software system 110 causes the client computer to obtain a copy of user help file 113 from the server computer, at step 418, and then requests the client computer to launch the server computer's copy of user help file 113, at step 420.

Following step 416 or step 420, when user 115 is done accessing custom user help information from user help file 113, execution of software system 110 continues in a conventional manner, at step 422.

Of course, various changes and modifications to the described illustrative embodiment will be apparent to those skilled in the art. These changes and modifications can be made without departing from the spirit and the scope of the invention and without diminishing its attendant advantages. It is therefore intended that such changes and modifications be covered by the following claims.

The invention claimed is:

1. A method of providing custom information to a user of software, comprising the steps of:

creating software having a user help file for custom user help information, the user help file being devoid of user help information;

distributing the software with the user help file devoid of the user help information to at least one customer;

the customer populating the user help file with custom user help information that is distinctive of a computing environment of the customer;

executing the software with the populated user help file in the computing environment; and a user of the executing software in the computing environment accessing the custom user help information in the populated user help file of the executing software.

2. The method of claim 1 wherein:

the step of accessing comprises the step of the user selecting a menu item identifying the user help file from a help menu of the executing software.

3. A method of providing custom information to a user of software, comprising the steps of:

a customer of software obtaining software having a user help file for custom user help information, the user help file being devoid of user help information;

the customer populating the user help file with custom user help information distinctive of a computing environment of the customer;

executing the software with the populated user help file in the customer computing environment; and a user of the executing software in the customer computing environment accessing the custom user help information in the populated user help file of the executing software.

4. The method of claim 3 wherein:

the step of accessing comprises the step of the user selecting a menu item identifying the user help file from a help menu of the executing software.

5. A method of enabling provisioning of custom information to a user of software, comprising the steps of:

creating software having a user help file for custom user help information accessible by a user of executing said software, the user help file being devoid of the user help information but adapted for being populated by a customer of the software with custom user help information that is distinctive of a computing environment of the customer; and distributing the software with the user help file devoid of the user help information to the customer for populating the user help file with the custom user help information that is distinctive of the computing environment and for execution of the software in the computing environment.

6. The method of claim 5 wherein:

the step of creating comprises the step of creating the software further having a help menu that includes a menu item identifying the user help file so that a user of executing said software accesses the user help file by selecting the pointer from the menu.

7. A computer-usable program storage device having embodied therein software, a user help file for custom user help information, the help file being devoid of user help information, and means for providing the custom user help information to a user of the software, said means being computer-readable program code means for causing the computer to perform the functions of:

enabling a customer of the software to populate the embodied user help file that is devoid of user help information with the custom user help information distinctive of a computing environment of the customer; and enabling a user of the software executing in the computing environment of the customer to access the custom user help information in the populated user help file.

8. The device of claim 7 wherein:

the function of enabling comprises the function of enabling the user to access the custom user help information by selecting a menu item identifying the populated user help file from a help menu of the executing software.

* * * * *